US008337594B2

(12) United States Patent
Corma Canos et al.

(10) Patent No.: US 8,337,594 B2
(45) Date of Patent: Dec. 25, 2012

(54) USE OF A MICROPOROUS CRYSTALLINE MATERIAL OF ZEOLITIC NATURE WITH RHO STRUCTURE IN NATURAL GAS PROCESSING

(75) Inventors: Avelino Corma Canos, Valencia (ES); Miguel Palomino Roca, Valencia (ES); Fernando Rey Garcia, Valencia (ES); Susana Valencia Valencia, Valencia (ES)

(73) Assignees: Consejo Superior de Investigaciones Cientficas (CSIC), Madrid (ES); Universidad Politecnica de Valencia (UPV), Valencia (ES)

( * ) Notice: Subject to any disclaimer, the term of this patent is extended or adjusted under 35 U.S.C. 154(b) by 0 days.

(21) Appl. No.: 13/272,586

(22) Filed: Oct. 13, 2011

(65) Prior Publication Data

US 2012/0067216 A1  Mar. 22, 2012

Related U.S. Application Data

(63) Continuation of application No. PCT/ES2010/070236, filed on Apr. 19, 2010.

(30) Foreign Application Priority Data

Apr. 17, 2009 (ES) .................... 200901136

(51) Int. Cl.
*B01D 53/02* (2006.01)
(52) U.S. Cl. .......................... 95/130; 95/139

(58) Field of Classification Search ............... 95/90, 95, 95/116, 130, 139
See application file for complete search history.

(56) References Cited

U.S. PATENT DOCUMENTS

| 3,904,738 | A | | 9/1975 | Robson | |
|---|---|---|---|---|---|
| 4,960,578 | A | * | 10/1990 | Vaughan et al. | 423/713 |
| 5,557,030 | A | * | 9/1996 | Markovs et al. | 585/826 |
| 6,398,889 | B2 | * | 6/2002 | Dunne | 149/96 |
| 2006/0116430 | A1 | * | 6/2006 | Wentink et al. | 518/726 |
| 2009/0214407 | A1 | * | 8/2009 | Reyes et al. | 423/230 |
| 2009/0288557 | A1 | | 11/2009 | Carati et al. | |
| 2010/0132549 | A1 | * | 6/2010 | Yaghi et al. | 95/128 |
| 2010/0186588 | A1 | * | 7/2010 | Yaghi et al. | 95/127 |

FOREIGN PATENT DOCUMENTS

WO   2008/000380      1/2008
WO   WO 2008140788 A1 * 11/2008

OTHER PUBLICATIONS

International Search Report issued Jun. 11, 2010 in International (PCT) Application No. PCT/ES2010/070236.
P. Li et al., "Adsorption Separation of $N_2$, $O_2$, $CO_2$ and $CH_4$ Gases by β-Zeolite", Microporous and Mesoporous Materials, vol. 98, pp. 94-101, 2007.

* cited by examiner

*Primary Examiner* — Duane Smith
*Assistant Examiner* — Christopher P Jones
(74) *Attorney, Agent, or Firm* — Wenderoth, Lind & Ponack, L.L.P.

(57) ABSTRACT

The present invention describes the use of isostructural zeolites with rho zeolitic structure in processes of adsorption and separation of the various components of natural gas.

13 Claims, 2 Drawing Sheets

USE OF A MICROPOROUS CRYSTALLINE MATERIAL OF ZEOLITIC NATURE WITH RHO STRUCTURE IN NATURAL GAS PROCESSING

This application is a continuation application of PCT/ES2010/070236 filed Apr. 19, 2010.

TECHNICAL FIELD OF THE INVENTION

The present invention relates to the technical field of the microporous crystalline materials of zeolitic nature, useful in natural gas processing.

STATE OF THE ART PRIOR TO THE INVENTION

The separation and purification of natural gas involves mainly a step wherein the methane must be separated from hydrogen and gases with acid properties, such as the $CO_2$ and $SH_2$ accompanying the same, [J. Phys. Chem. C 2008, 112, 5048-5056]. The acid gases cause corrosion problems in natural gas storage tanks, as well as clogging problems of the gas pipelines employed for the transportation thereof. The presence of Nitrogen diminishes the amount of heat transported by volume unit, as well as a significant increase in the condensation pressure. For that, these gases must be removed from the natural gas stream before its transportation. Currently, the separation of nitrogen is performed by cryogenic distillation of methane and $N_2$, whereby other gases condensing at low temperature must be previously removed. Thus, the $CO_2$ is removed from the natural gas stream by chemical reaction with amines in the presence of suitable solvents. This technology is the most widely used nowadays in the purification and separation of methane from natural gas. However, this technology suffers from many drawbacks. On one side, the cryogenic distillation for the removal of nitrogen is highly demanding from an energy point of view. And on the other side, the removal of $CO_2$ through capture with amines means that the natural gas must be decompressed to be re-pressurized, and thus enable its transportation through gas pipelines. All this process involves a high energy consumption that has led many companies to develop new technologies based on membranes or adsorption processes.

The use of dense organic membranes for the separation of methane from the natural gas stream has been described, since the $CO_2$ can diffuse through them while the methane does not. High density organic polymers capable of separating $N_2/CH_4$ mixtures with high selectivity but with low permeability to methane have also been described.

Likewise the use of microporous materials, and particularly zeolites, has been described in the selective adsorption of $CO_2$ in mixtures of methane/$CO_2$. Thus, microporous titanosilicates have been described as molecular gates capable of separating methane from $CO_2$ or Nitrogen from $CO_2$ [NATURE, 2001, 412, 720-723; U.S. Pat. No. 6,068,682 (2000)], depending on the heat treatment conditions to which the adsorbent is subjected. More recently, the zeolite ERS-7 has been described as an effective material in the separation of methane from gas mixtures containing nitrogen and $CO_2$ [WO2008/000380]. This zeolite presents a $CO_2$ adsorption capacity of approximately three times larger than that of methane in a range of pressures comprised between 2 and 25 bars, with a maximum adsorption capacity of approximately 175 mg of $CO_2$ per gram of zeolite at 0° C. It would be desirable to have microporous materials with higher adsorption capacities and being even more selective towards the $CO_2$ adsorption in $CO_2/CH_4$ mixtures. On the other side, the selectivity of this zeolite ERS-7 in separating $N_2/CH_4$ mixtures is very low, having been reported that the molar ratios of the maximum adsorption capacities of $N_2$ and $CH_4$ at 1 bar and 273 K are always of less than 1.5.

In this patent of invention the use of a zeolitic material isostructural to RHO zeolite is described for purification and separation processes of methane from natural gas streams or from streams containing $CO_2$ and methane, the $CO_2$ being preferentially and selectively adsorbed, and remaining the methane free in the stream. These zeolites can be suitably used in gas separation processes with technology described in the state of the art as so-called 'Pressure Swing Adsorption (PSA)', 'Thermal Swing Adsorption (TSA)' or 'Pressure Vacuum Swing Adsorption (PVSA)' wherein adsorption cycles alternate with desorption cycles of the adsorbed gas ($CO_2$ in this case) through washing in a stream of a gas that is not absorbed in the PSA process (preferably $N_2$, $CH_4$ in the process described in this invention), by heat treatment in the TSA treatment, and by evacuation of the adsorbed gas in vacuo (PVSA). In all cases, it is desirable for the zeolite to recover its adsorption capacity in short times, and temperatures or pressures as close as possible to those employed in the adsorption cycles.

The RHO zeolite, which shows windows with crystallographic openings of 0.36×0.36 nm giving access to large 'quasi-spherical' cavities of 1.15 nm in diameter, meets all these requirements, allowing the access to $CO_2$ molecules, but preventing the same to methane, and therefore can be used in separation or purification processes of methane in natural gas streams.

DESCRIPTION OF THE INVENTION

The zeolites can be classified as zeolites of extra large, large, medium or small pore according to the opening of its channels. Thus, these zeolites of small pore will have channels with openings formed by 8 tetrahedrons, while those of medium pore will be of 10 tetrahedrons, the large ones of 12 and finally, the extra large will possess channels with openings of more than 12 tetrahedrons.

The RHO zeolite is a small pore zeolite possessing a tridirectional system of channels with openings of 0.36×0.36 nm that are intersected forming a quasi-spherical super cavity of 1.15 nm in diameter and with a net density of 14.7 tetrahedrons/$nm^3$. This porous system confers to this zeolite a high adsorption capacity, but only small kinetic diameter molecules such as water, nitrogen, oxygen and linear hydrocarbons among others can access to the inside thereof.

The present invention relates to a separation or purification process of the hydrocarbons present in a natural gas stream and its recovery, using a zeolitic material isostructural to the RHO zeolite comprising at least the following steps:

(a) contacting the natural gas stream with the zeolitic material,
(b) recovering the unadsorbed components.

The RHO zeolite is characterized by presenting adsorption capacities in the thermodynamic equilibrium quite different for $CO_2$ and methane among others, which makes possible its application in separation and purification processes of methane and other hydrocarbons present in natural gas streams. The equilibrium condition is reached when the amount of adsorbate does not increase over time at fixed conditions of adsorbate pressure and temperature. The thermodynamic efficiency of an adsorbent in separation processes is determined from the value of the ratio of its adsorption capacities in equilibrium conditions of the products that are intended to be separated, $R_A$.

In principle, the higher the adsorption capacity of a zeolite, the less amount will be required to separate a given amount of methane-$CO_2$ mixture. Thus, for a certain separation process to be feasible at a practical level it is required for the zeolites to show high $R_A$ values and high or moderate adsorption capacities.

The process described in the present invention can be carried out at a temperature between −100 and 200° C., preferably between −25 and 150° C., more preferably between 0 and 100° C. and at a pressure between 0.1 and 30 bar, preferably between 0.5 and 25 bar, more preferably between 1 and 10 bar.

According to a particular embodiment, the $CO_2$ is preferably adsorbed and the methane is not preferably adsorbed.

According to another particular embodiment, the $CO_2$ is preferably adsorbed and the methane and nitrogen are not preferably adsorbed. In addition, the mixture of gases that have not been adsorbed, methane and nitrogen, can be contacted again with the zeolitic material, the nitrogen being the one that is preferably adsorbed versus methane.

According to another particular embodiment, the $CO_2$ is preferably adsorbed and a mixture of light hydrocarbons of four or fewer carbons as component is preferably not adsorbed.

According to another particular embodiment, the $CO_2$ is preferably adsorbed and a mixture of nitrogen and light hydrocarbons of four or fewer carbons is preferably not adsorbed. In addition, the mixture of gases that have not been adsorbed, nitrogen and light hydrocarbons, can be contacted again with the zeolitic material, the nitrogen being the one that is preferably adsorbed versus the light hydrocarbons.

As already mentioned above, it is known the designation of acid gases to refer to the set of the following components of natural gas, $CO_2$ and $SH_2$.

According to another particular embodiment, the mixture contains acid gases as components that are preferably adsorbed and methane that is not preferably adsorbed.

According to another particular embodiment, the mixture contains acid gases as components that are preferably adsorbed and methane and nitrogen as components that are not preferably adsorbed. In addition, the mixture of gases that have not been adsorbed, nitrogen and methane, can be contacted again with the zeolitic material, the nitrogen being the one that is preferably adsorbed versus methane.

According to another particular embodiment, the mixture contains acid gases as components that are preferably adsorbed and a mixture of light hydrocarbons of four or fewer carbons as component that is not preferably adsorbed.

According to another particular embodiment, the mixture contains acid gases as components that are preferably adsorbed and a mixture of nitrogen and light hydrocarbons of four or fewer carbons as component that is not preferably adsorbed. In addition, the mixture of gases that have not been adsorbed, nitrogen and light hydrocarbons, can be contacted again with the zeolitic material, the nitrogen being the one that is preferably adsorbed versus light hydrocarbons.

In the present invention, it is shown that the RHO zeolite shows adsorption capacities quite different for $CO_2$ and methane, with high $CO_2$ adsorption capacities. According to a particular embodiment of the present invention, the RHO zeolite has a $CO_2$ adsorption capacity higher than 100 mg/g at 1000 mbar and in the range of temperatures comprised between 10 and 60° C., and an adsorption capacity lower than 10 mg/g for methane in these same conditions. Therefore, the RHO zeolite is a very suitable adsorbent to carry out separation or purification processes of methane in natural gas streams.

The separation process of this invention means that a certain amount of RHO zeolite is contacted with a mixture of gases (natural gas) containing, among others, $CO_2$ and methane, and wherein the $CO_2$ is preferably adsorbed inside the RHO zeolite. The $CO_2$ and methane mixture and the RHO zeolite are maintained in contact for a certain time to enable the adsorption process to take place and, finally, the mixture of gases that have not been adsorbed is removed. The gas adsorbed in the zeolite is recovered by means of techniques such as dragging with another gas, increase in temperature, evacuation or combination of the above methods.

This separation process can also be carried out in columns, in which case different fronts of $CO_2$ and methane are obtained, depending on being more or less strongly retained in the RHO zeolite bed.

The separation conditions will depend on the exact composition of the mixture of gases containing methane and $CO_2$ that is intended to be separated. Thus, the lower limit of the pressure and temperature of separation will correspond to the conditions under which the $CO_2$ condensation occurs. Thus the process of this invention can be carried out between −100 and 200° C., preferably between −25 and 150 ° C., more preferably between 0 and 100° C., and at a pressure between 0.1 and 30 bar, preferably between 0.5 and 25 bar, more preferably between 1 and 10 bar.

Throughout the description and the claims the word "comprises" and its variants are not intended to exclude other technical features, additives, components or steps. For the skilled in the art, other objects, advantages and features of the invention will become apparent in part from the description and in part from the practice of the invention. The following examples are provided by way of illustration, and are not intended to be limiting of the present invention.

EXAMPLES

Example 1

Preparation of the Isostructural Material with the RHO Zeolite 0.98 g of crown ether 18-6, the structure of which is shown in FIG. 1, 0.705 g of Cs(OH), 0.45 g of NaOH and 6.04 g of distilled water are mixed. The mixture is stirred until complete dissolution is achieved. Next, 1.32 g of sodium aluminate (54% $Al_2O_3$, 32.8% $Na_2O$, 13.2% $H_2O$) are added and it is stirred until an homogeneous dissolution is obtained. Last, 10.5 g of silica suspension (Ludox AS-40) are added and the mixture is stirred for 24 hours. The composition of the gel is:

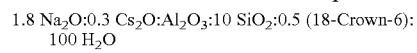
1.8 $Na_2O$:0.3 $Cs_2O$:$Al_2O_3$:10 $SiO_2$:0.5 (18-Crown-6): 100 $H_2O$ The mixture obtained is introduced in an autoclave provided with an internal lining of polytetrafluoroethylene and is introduced in a preheated stove at 125° C. for 5 days with stirring. The X-ray diffractogram of the solid obtained indicates the material has been obtained. Calcination at 600° C. in air for 3 hours allows to remove occluded organic species and to obtain the RHO material capable of being used in adsorption and separation processes.

Example 2

Adsorption of $CO_2$ at 5000 mbar in the RHO Material at 10° C.

The measurement of the $CO_2$ adsorption capacity of the RHO material prepared according to example 1 at 10° C. and 5000 mbar corresponds to 244 mg/g. Likewise, the value obtained after performing 20 cycles of adsorption/desorption is of 235 mg/g, which demonstrates that the RHO material retains its adsorption capacity.

Example 3

Adsorption of Methane at 5000 mbar in the RHO Material at 10° C.

The measurement of the $CO_2$ adsorption capacity of the RHO material prepared according to example 1 at 10° C. and 5000 mbar corresponds to 4 mg/g.

Example 4

Adsorption of $CO_2$ at 5000 mbar in the RHO Material at 25° C.

The measurement of the $CO_2$ adsorption capacity of the RHO material prepared according to example 1 at 25° C. and 5000 mbar corresponds to 234 mg/g.

Example 5

Adsorption of Methane at 5000 mbar in the RHO Material at 25° C.

The measurement of the $CO_2$ adsorption capacity of the RHO material prepared according to example 1 at 25° C. and 5000 mbar corresponds to 5 mg/g.

Example 6

Adsorption of $CO_2$ At 5000 mbar In the RHO Material At 45° C.

The measurement of the $CO_2$ adsorption capacity of the RHO material prepared according to example 1 at 45° C. and 5000 mbar corresponds to 206 mg/g.

Example 7

Adsorption of methane at 5000 mbar in the RHO material at 45° C.

The measurement of the $CO_2$ adsorption capacity of the RHO material prepared according to example 1 at 45° C. and 5000 mbar corresponds to 6 mg/g.

Example 8

Absorption of $CO_2$ at 5000 mbar in the RHO Material at 60° C.

The measurement of the $CO_2$ adsorption capacity of the RHO material prepared according to example 1 at 60° C. and 5000 mbar corresponds to 180 mg/g.

Example 9

Adsorption of Methane at 5000 mbar in the RHO Material at 60° C.

The measurement of the $CO_2$ adsorption capacity of the RHO material prepared according to example 1 at 60° C. and 5000 mbar corresponds to 7 mg/g.

Example 10

Adsorption of Methane at 1000 mbar in the RHO Material at 10° C.

The kinetic of the methane adsorption over the RHO material prepared according to example 1 indicates that in 30 minutes 0.5 mg of methane are adsorbed.

Example 11

Adsorption of Nitrogen at 1000 mbar in the RHO Material at 10° C.

The kinetic of the methane adsorption over the RHO material prepared according to example 1 indicates that in 30 minutes 3 mg of nitrogen are adsorbed.

Figure 1:
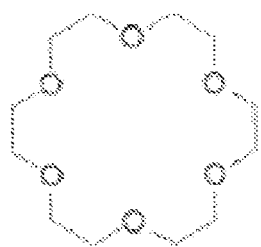
FIG. 1: the structure of the organic additive employed in example 1 for the synthesis of a material isostructural to the RHO zeolite is shown.
Figure 2:
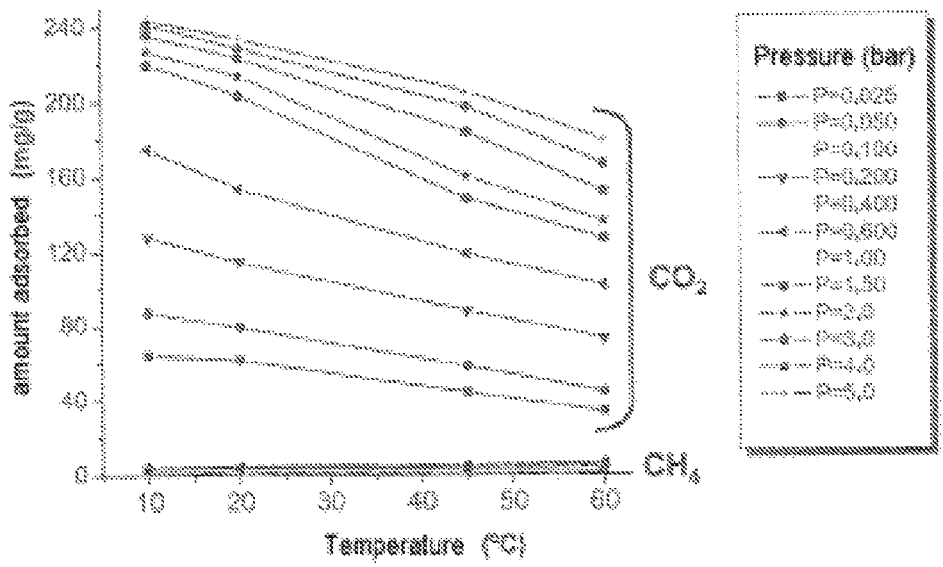
FIG. 2: the values of the adsorption capacity in the $CO_2$ and $CH_4$ equilibrium of the RHO material prepared according to example 1, at different pressures and different temperatures are shown. It can be seen that methane isobars are indistinguishable from each other due to the low adsorption capacity of the RHO zeolite at any temperature and/or pressure compared to those determined for $CO_2$.
Figure 3:
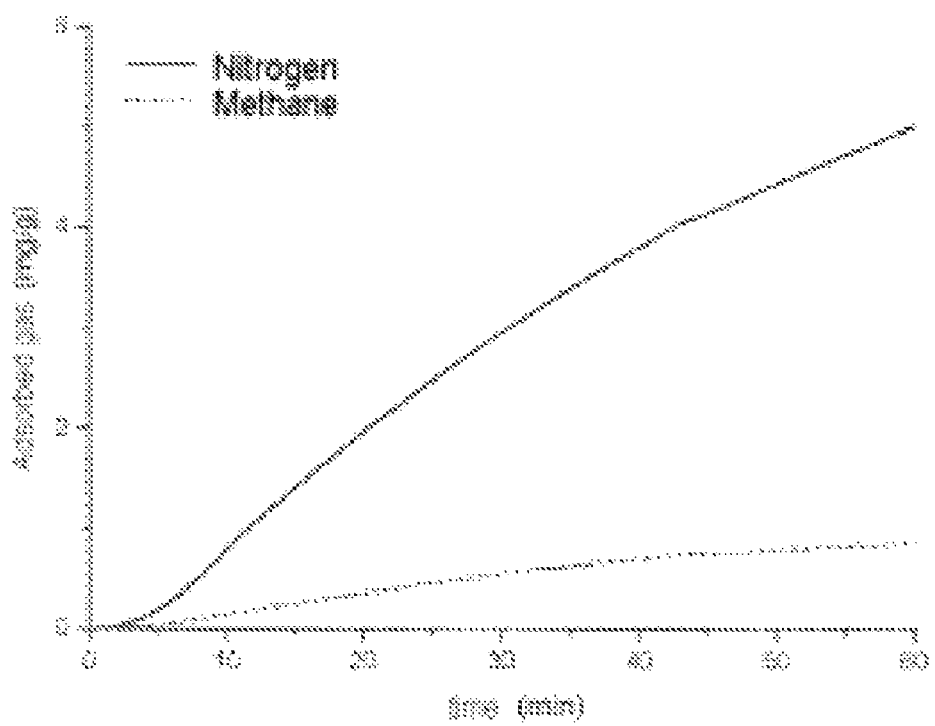
FIG. 3: the kinetics of methane and nitrogen adsorption at 10° C. and at 1000 mbar of gas pressure in a RHO material prepared according to example 1 are shown. It can be observed that nitrogen diffuses more quickly than methane in these conditions.

The invention claimed is:

1. A process of separation or purification of hydrocarbons present in a natural gas stream and recovery using a zeolitic material isostructural to RHO zeolite comprising:
    (a) contacting the natural gas stream with the zeolitic material, and
    (b) recovering the unadsorbed components of the natural gas stream.

2. The process of separation or purification according to claim 1, wherein the process is carried out at a temperature of between −100 and 200° C.

3. The process of separation or purification according to claim 1, wherein the process is carried out at a pressure of between 0.1 and 30 bar.

4. The process of separation or purification according to claim 1, wherein the natural gas stream comprises $CO_2$ that is preferably adsorbed and methane that is not preferably adsorbed.

5. The process of separation or purification according to claim 1, wherein the natural gas stream comprises $CO_2$ that is preferably adsorbed and methane and nitrogen that are not preferably adsorbed.

6. The process of separation or purification according to claim 5, wherein the process also comprises contacting a mixture of gases in the natural gas stream that are not preferably adsorbed with the zeolitic material.

7. The process of separation or purification according to claim 6, wherein nitrogen is preferably adsorbed.

8. The process of separation or purification according to claim 1, wherein the natural gas stream comprise $CO_2$ that is preferably adsorbed and a mixture of light hydrocarbons of four or fewer carbons as components of the natural gas stream that are not preferably adsorbed.

9. The process of separation or purification according to claim 1, wherein the natural gas stream comprises $CO_2$ that is preferably adsorbed and a mixture of nitrogen and light hydrocarbons of four or fewer carbons as components of the natural gas stream that are not preferably adsorbed.

10. The process of separation or purification according to claim 1, wherein a mixture of gases in the natural gas stream contains acid gases as components of the natural gas stream that are preferably adsorbed and methane that is not preferably adsorbed.

11. The process of separation or purification according to claim 1, wherein a mixture of gases in the natural gas stream contains acid gases as components of the natural gas stream that are preferably adsorbed and methane and nitrogen as components of the natural gas stream that are not preferably adsorbed.

12. The process of separation or purification according to claim 1, wherein a mixture of gases in the natural gas stream contains acid gases as components of the natural gas stream that are preferably adsorbed and a mixture of light hydrocarbons of four or fewer carbons as components of the natural gas stream that are not preferably adsorbed.

13. The process according to claim 1, wherein a mixture of gases in the natural gas stream contains acid gases as components of the natural gas stream that are preferably adsorbed and a mixture of nitrogen and light hydrocarbons of four or fewer carbons as components of the natural gas stream that are not preferably adsorbed.

* * * * *